United States Patent
Ablabutyan

(10) Patent No.: US 6,183,187 B1
(45) Date of Patent: Feb. 6, 2001

(54) INTEGRATED LIFT AND TOW HITCH

(75) Inventor: Karapet Ablabutyan, Glendale, CA (US)

(73) Assignee: Maxon Lift Corporation, Sante Fe Springs, CA (US)

( * ) Notice: Under 35 U.S.C. 154(b), the term of this patent shall be extended for 0 days.

(21) Appl. No.: 09/425,867

(22) Filed: Oct. 23, 1999

(51) Int. Cl.⁷ ..................... B60P 1/44
(52) U.S. Cl. ............. 414/558; 414/917; 296/57.1; 280/495; 187/272
(58) Field of Search .................. 414/540, 545, 414/546, 558, 557, 556, 917; 187/242, 272; 280/495, 511; 296/57.1

(56) References Cited

U.S. PATENT DOCUMENTS

| | | | |
|---|---|---|---|
| 2,989,196 | * 6/1961 | Lugash | 414/558 |
| 3,112,833 | 12/1963 | Novotney . | |
| 3,113,684 | 12/1963 | Novotney . | |
| 3,138,270 | * 6/1964 | McCarty | 414/558 |
| 3,258,140 | 6/1966 | Appleman . | |
| 3,369,678 | * 2/1968 | Robinson | 414/558 |
| 3,429,464 | 2/1969 | Robinson . | |
| 3,474,921 | 10/1969 | Rossoni . | |
| 3,498,481 | * 3/1970 | Size | 414/558 |
| 3,528,573 | * 9/1970 | Denner | 414/558 |
| 3,545,791 | 12/1970 | Lugash . | |
| 3,638,811 | 2/1972 | Robinson . | |
| 3,666,121 | 5/1972 | Denner et al. . | |
| 3,737,055 | * 6/1973 | Pettit | 414/558 |
| 4,078,676 | 3/1978 | Mortenson . | |
| 4,395,187 | * 7/1983 | Corley | 414/558 X |
| 4,722,651 | 2/1988 | Antal . | |
| 4,763,487 | * 8/1988 | Wicks | 414/558 X |
| 4,836,736 | 6/1989 | Neagu . | |
| 4,930,973 | 6/1990 | Robinson . | |
| 5,277,275 | * 1/1994 | Ablabutyan | 187/272 |
| 5,449,267 | * 9/1995 | Ablabutyan | 414/545 X |

FOREIGN PATENT DOCUMENTS

| | | | |
|---|---|---|---|
| 3307857 | * 9/1984 | (DE) | 414/558 |
| 3737651 | * 5/1989 | (DE) | 414/558 |
| 49193 | * 4/1982 | (WO) | 414/558 |

* cited by examiner

Primary Examiner—Robert P. Olszewski
Assistant Examiner—Gerald J. O'Connor
(74) Attorney, Agent, or Firm—Malcolm B. Wittenberg

(57) ABSTRACT

A integrated lift gate and hitch system, configured to be secured to a vehicle chassis, includes two support brackets, a cross brace extending between and secured to the support brackets, and a tow hitch secured to the cross brace. The cross brace and tow hitch are positioned such that the tow Lite L is recessed no more than six inches from the rearmost extremity of either the vehicle chassis or the lift gate when the latter is stowed.

1 Claim, 7 Drawing Sheets

INTEGRATED LIFT AND TOW HITCH

BACKGROUND OF THE INVENTION

1. Field of the Invention

The present invention relates to lift gates used to bring loads to and from ground level and the level of a vehicle's payload area. Specifically, the invention relates to lift gates that also provide a tow hitch for pulling additional loads.

2. Description of the Related Art

Lift gates are typically mounted at the rear of trucks and the like to bring payloads from ground level up to the bed of the truck. A difficulty associated with conventional lift gates is that they often prevent the use of tow hitches.

One prior art solution has been to recess the tow hitch under the vehicle body so that raising and lowering the lift gate does not interfere with the hitch. However, such a location greatly reduces the usability of the hitch. The recessed hitch complicates access, increases the risk of jack-knifing the pulled load and reduces the effective turning radius of the vehicle-trailer combination.

Other prior art attempts include the inventions disclosed in U.S. Pat. No. 3,545,791 to Lugash and U.S. Pat. No. 3,638,811 to Robinson, both of which are incorporated by reference for their teaching of conventional hydraulic lift gate technology, that use a hitch secured to the lift gate mechanism. These systems suffer from reliability and wear problems due to the stress placed on the lift gate mechanism by the towing forces of the hitch.

Further attempts to address these shortcomings have not been satisfactory. For example, U.S. Pat. No. 3,474,921 to Rossoni discloses a lift tailgate that offers an attachment point for a removable hitch. Although this allows the operation of the lift gate without interference from the hitch, it requires the additional effort of installing the hitch before it can be used. Furthermore, this attachment point presents another potential area for failure due to mechanical stress or operator error. Another attempt is disclosed in U.S. Pat. No. 3,666,121 to Denner et al. A movable hitch ball can be swung and locked into position. Again, this requires additional effort and is subject to mechanical failure or operator error. Finally, U.S. Pat. No. 3,112,833 to Novotney discloses a pintle hook for towing that is secured to the lift gate mechanism. To help reinforce the lift gate mechanism, Novotney locks the lift gate mechanism to the vehicle chassis thus offloading the towing forces from the mechanism. However, as with the other systems discussed above, the locking means represents another failure point and an additional complication in using the hitch.

Accordingly, what has been needed is a lift gate and tow hitch system where the hitch is easily accessible and does not interfere with the operation of the lift gate. What has also been needed is a lift gate and tow hitch system that presents the tow hitch in a position designed to minimize the risk of jack-knifing a towed trailer and maximize the turning radius of the vehicle and towed trailer. Additionally, there is a need for lift gate and tow hitch systems that have a lift gate that stores compactly when not in use to allow easy access to the vehicle payload area. There is also a need for a lift gate and tow hitch system that permits the use of a loading ramp. This invention meets these and other needs.

SUMMARY OF THE INVENTION

Generally, the invention comprises an integrated lift gate and hitch assembly configured to be secured to a vehicle chassis having opposing support brackets secured to the vehicle chassis, a cross brace carrying a hitch secured to the support brackets, opposing parallelogram linkages each having upper and lower arms and proximal and distal pivot members, wherein the proximal pivot members are secured to the support brackets, a lift gate rotatably attached to the distal pivot members, having a stop configured to prevent rotation of the lift gate away from the upper and lower arms past a generally horizontal position parallel with the vehicle chassis and configured to allow rotation of the lift gate toward the upper and lower arms to a generally vertical position perpendicular with the vehicle chassis, a torque member secured to the lower arms; and an hydraulic cylinder pivotally secured at one end to the support brackets and at the other end to the torque member; wherein when the lift gate is rotated to the horizontal position, extension of the hydraulic cylinder raises the lift gate from a lowered position to a raised position while maintaining the horizontal position and when the lift gate is rotated to the vertical position, extension of the hydraulic cylinder raises and inverts the lift gate into a stowed position above the hitch and below the vehicle chassis. Preferably, the lift gate further comprises a hinged extension that can unfold from the lift gate to the horizontal plane, but no further. The upper and lower arms carry support members to receive the hinged extension when the lift gate is inverted into the stowed position. The hitch is placed sufficiently aft to provide easy access, while maximizing the turning radius of the vehicle trailer combination; minimizing the risk of jack-knifing the trailer when reversing. Preferably, the hitch ball is recessed no more than about 6 inches. The system is configured to allow the use of a convention sliding loading ramp when the lift gate is lowered.

BRIEF DESCRIPTION OF THE DRAWINGS

The aforementioned advantages of the invention, as well as additional advantages thereof, will be more fully understood as a result of a detailed description of a preferred embodiment when taken in conjunction with the accompanying drawings in which.

DETAILED DESCRIPTION OF THE INVENTION

Figure 1:
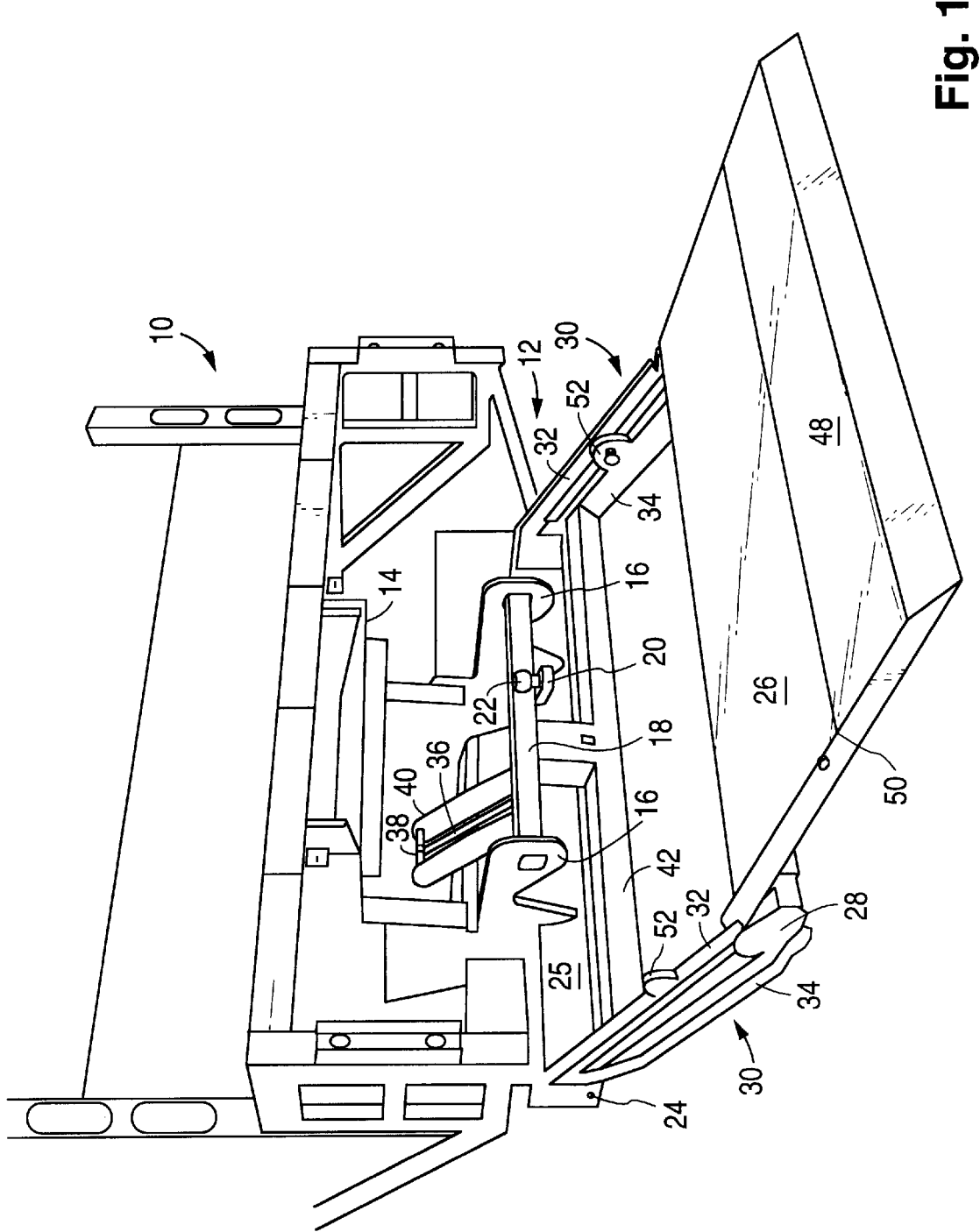
FIG. 1 is a schematic diagram of the inventive lift gate and hitch system shown attached to a vehicle.

FIGS. 1–7 show a truck 10 outfitted with a lift gate and hitch system 12. Lift gate and hitch system 12 generally comprises two support brackets 16 rigidly secured to the truck chassis 14 by welding or mechanically by bolts or other conventional means. Cross brace 18 extends between and is secured to support brackets 16 and has a hitch 20, typically having a ball 22 suitable for conventional trailer attachment. Pivot members, brackets 24, proximal to the vehicle chassis 14, are outwardly positioned and secured to support brackets 16 by beam 25. Lift gate 26 has complementary, distal pivot members, brackets 28. Parallelogram linkages 30 are formed by upper arms 32 and lower arms 34 attached to pivot brackets 24 and lift gate brackets 28. The linkages 30 are configured to maintain the orientation of lift gate brackets 28 to pivot brackets 24 as upper arms 32 and lower arms 34 are raised and lowered. The arms are actuated by hydraulic cylinder 36 that is pivotally attached at one end to support brackets 16 by beam 38 and arms 40. The other end of hydraulic cylinder 36 is pivotally attached to lower arms 34 by torque member 42. Thus, extension of hydraulic cylinder 36 pivots upper arms 32 and lower arms 34 about pivot brackets 24 to lower lift gate brackets 28. Conversely, retraction of hydraulic cylinder 36 raises them.

Figure 2:
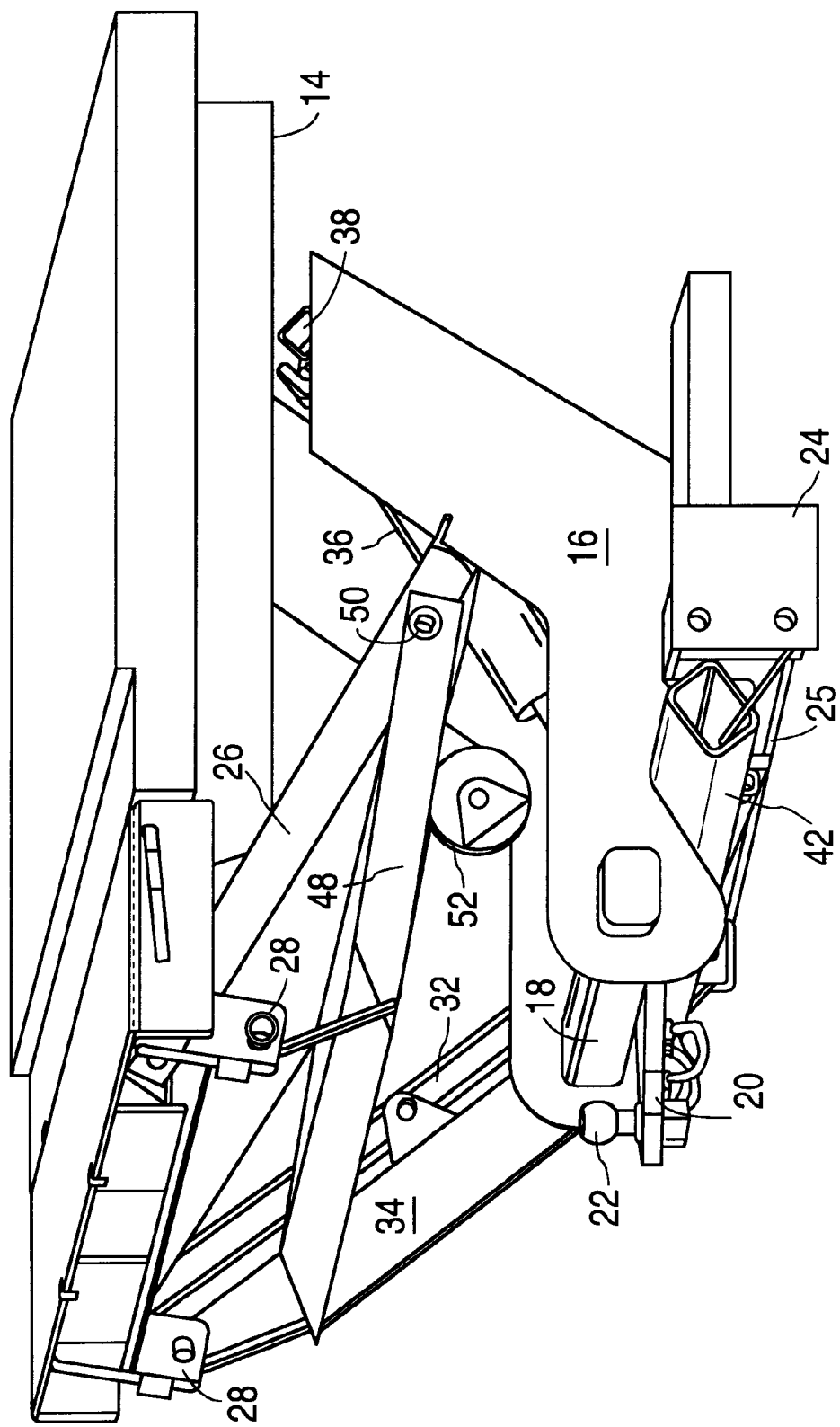
FIG. 2 is a detail view of the lift gate and hitch system in its stowed position.
Figure 3:
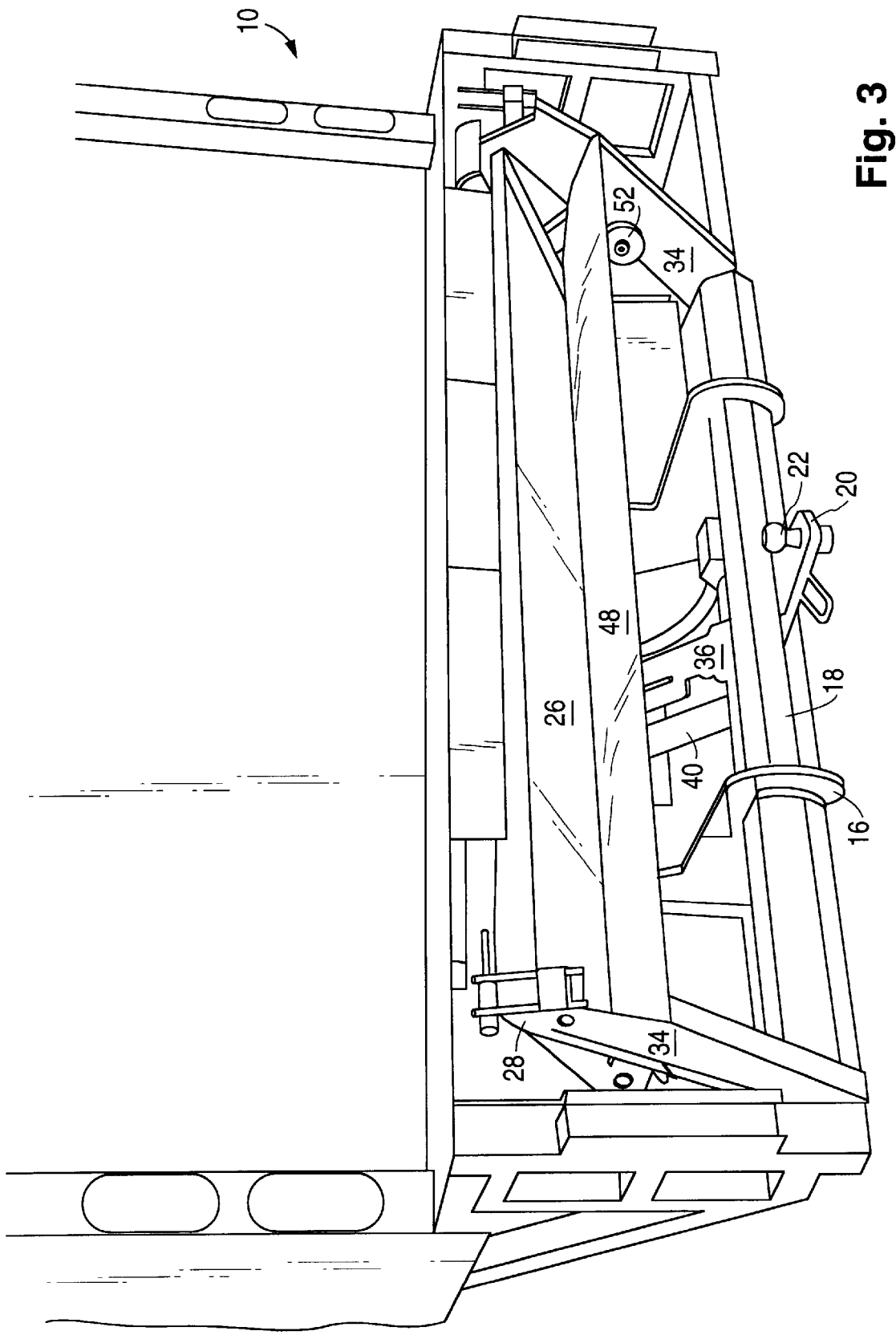
FIG. 3 is an alternate detail view of the lift gate and hitch system in its stowed position.
Figure 4:
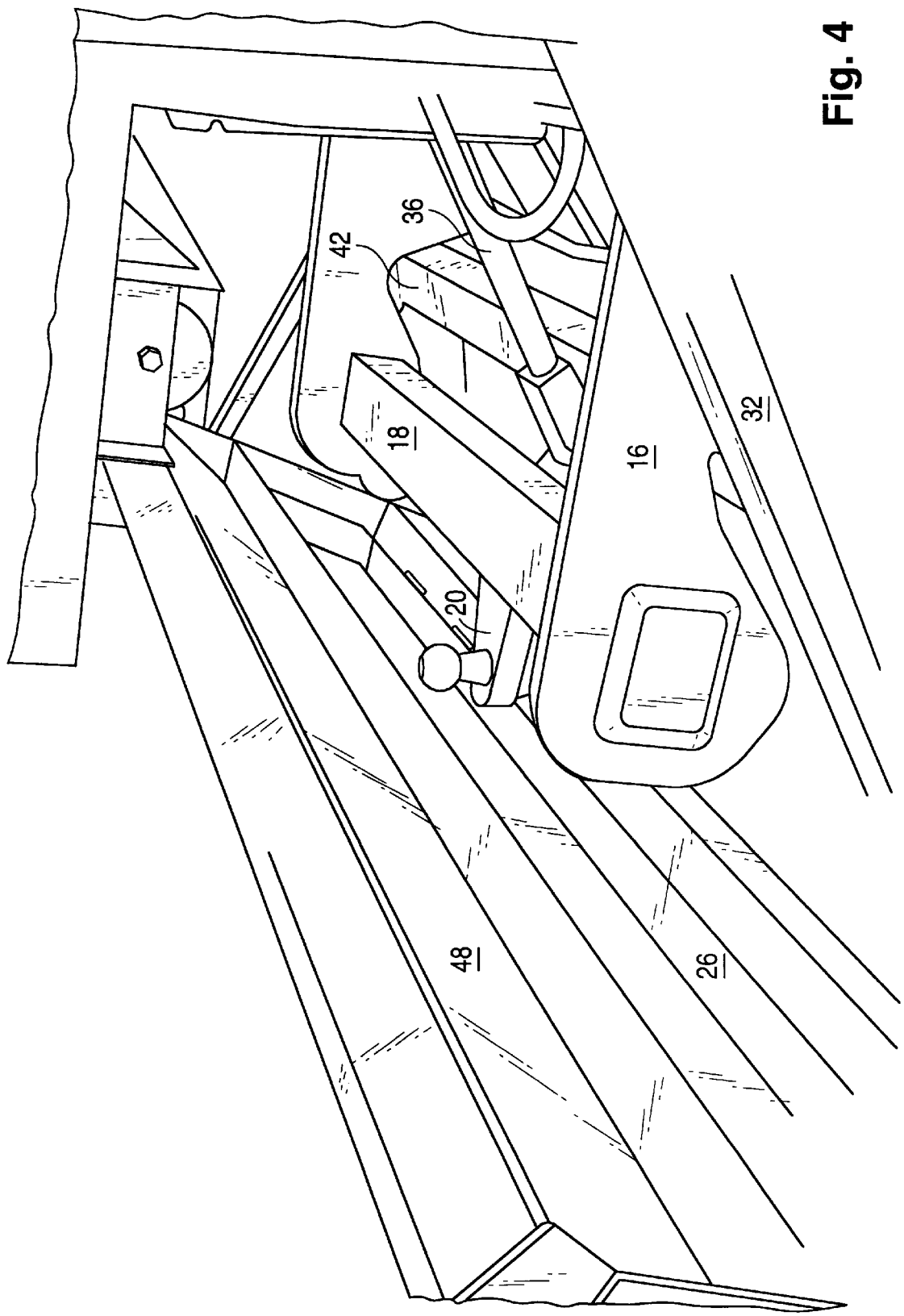
FIG. 4 shows the lift gate in the vertical position.
Figure 5:
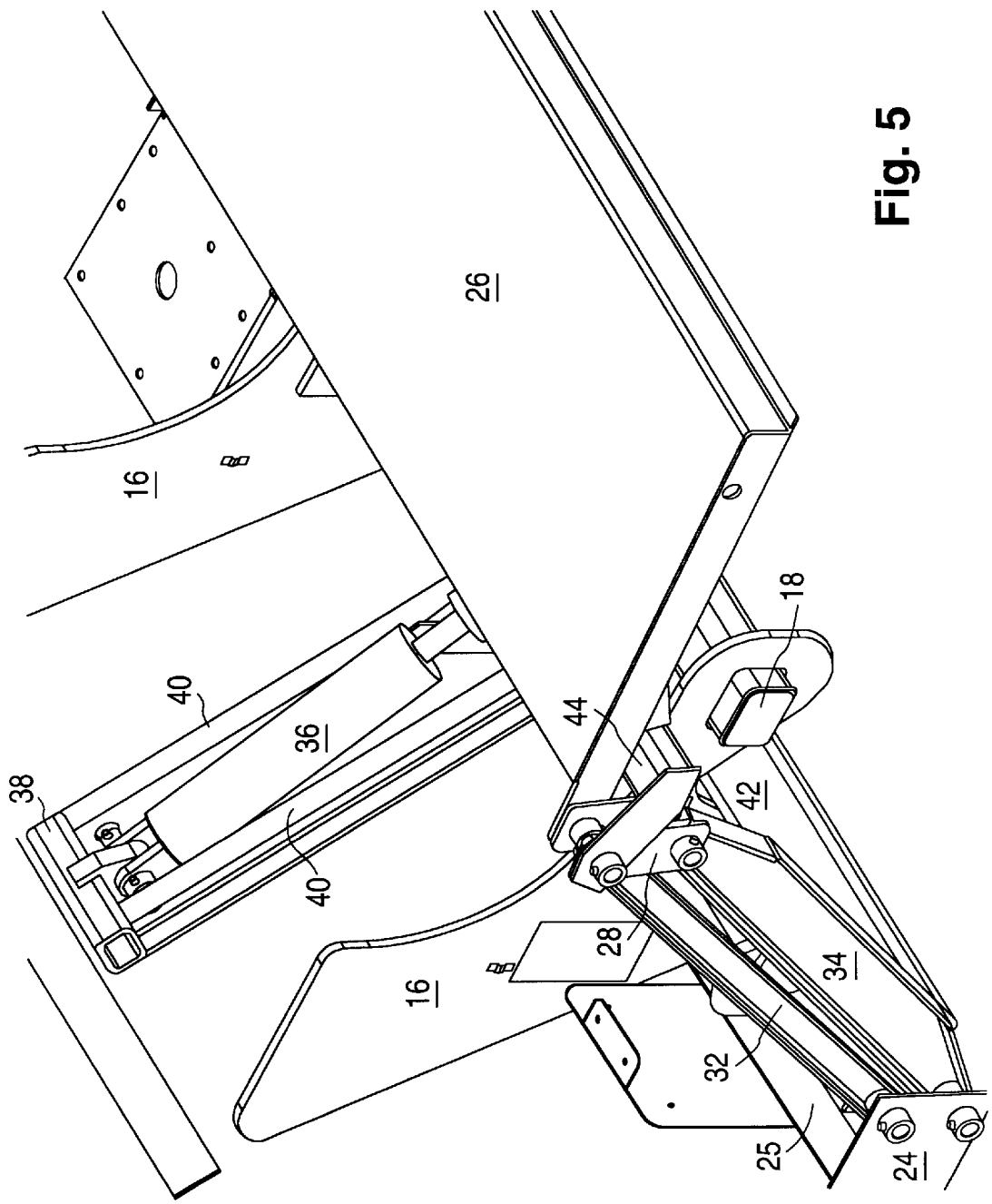
FIG. 5 is a perspective view showing the lift gate in the lifted horizontal position.
Figure 6:
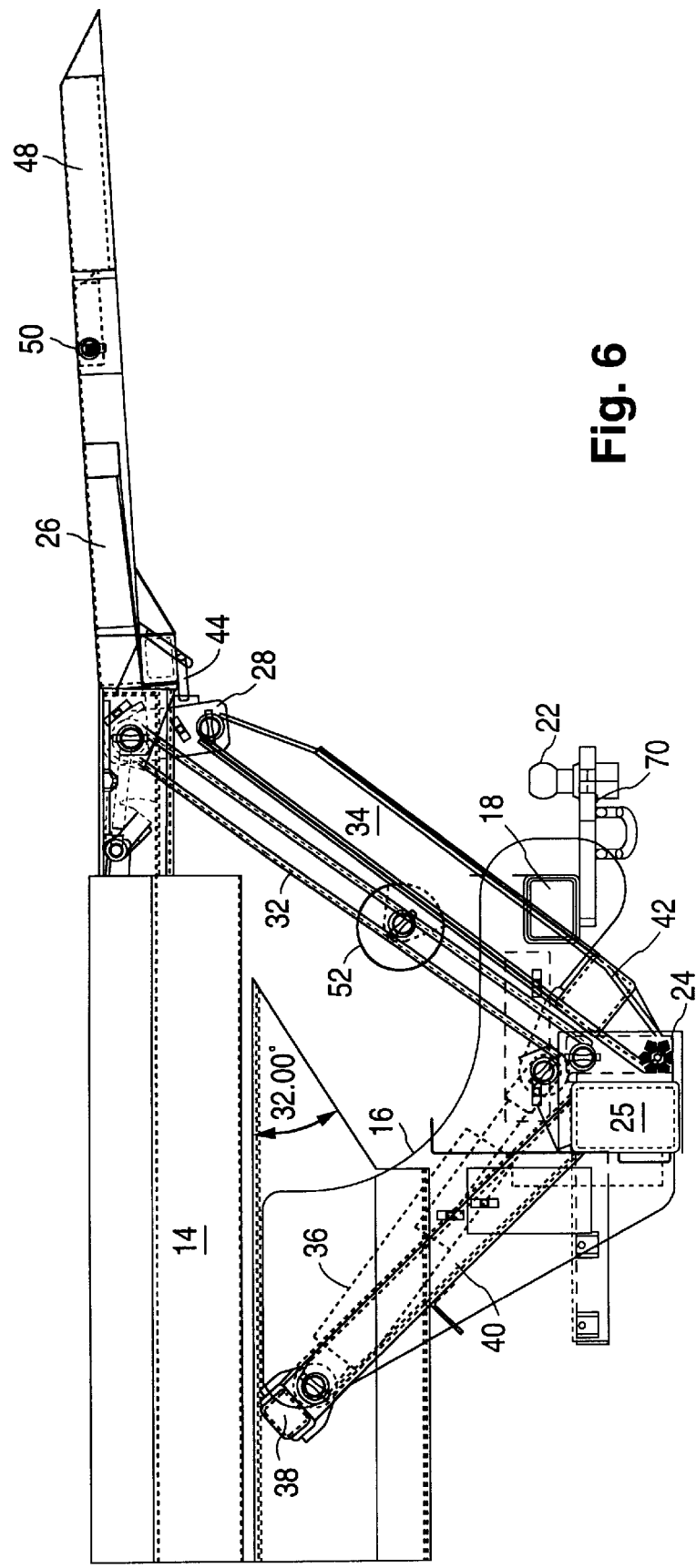
FIG. 6 is a side view, partially in section, showing the lift gate in the lifted horizontal position.

Lift gate 26, secured to lift gate brackets 28, is configured to be raised into either the load lifting position shown in FIGS. 1, 5 and 6 or the stowed position shown in FIGS. 2 and 3. Specifically, lift gate 26 is rotatably attached to lift gate brackets 28 with motion limiting stops 44 that prevent rotation of lift gate 26 away from upper and lower arms 32 and 34 beyond the horizontal plane. This keeps lift gate 26 in a plane parallel with the ground and vehicle chassis 14 to facilitate loading and unloading. Alternatively, lift gate 26 may be rotated at lift gate brackets 28 toward upper and lower arms 32 and 34 to the generally vertical position shown in FIG. 4. In this position, actuation of hydraulic cylinder 36 raises and inverts lift gate 26 until it is located in its stowed position above hitch 20 shown in FIGS. 2 and 3.

In a preferred embodiment, lift gate 26 is equipped with an extension 48 attached by hinge 50. The configuration of hinge 50 allows the extension to fold against lift gate 26 in the direction of the system 12, but prevents extension 48 from rotating beyond the plane of lift gate 26, thus providing a suitable lifting platform. Wheels 52, or other suitable support members, carried on upper and lower arms 32 and 34 receive extension 48 and support it against gravity as lift gate 26 is raised and inverted into its stowed position.

Figure 7:
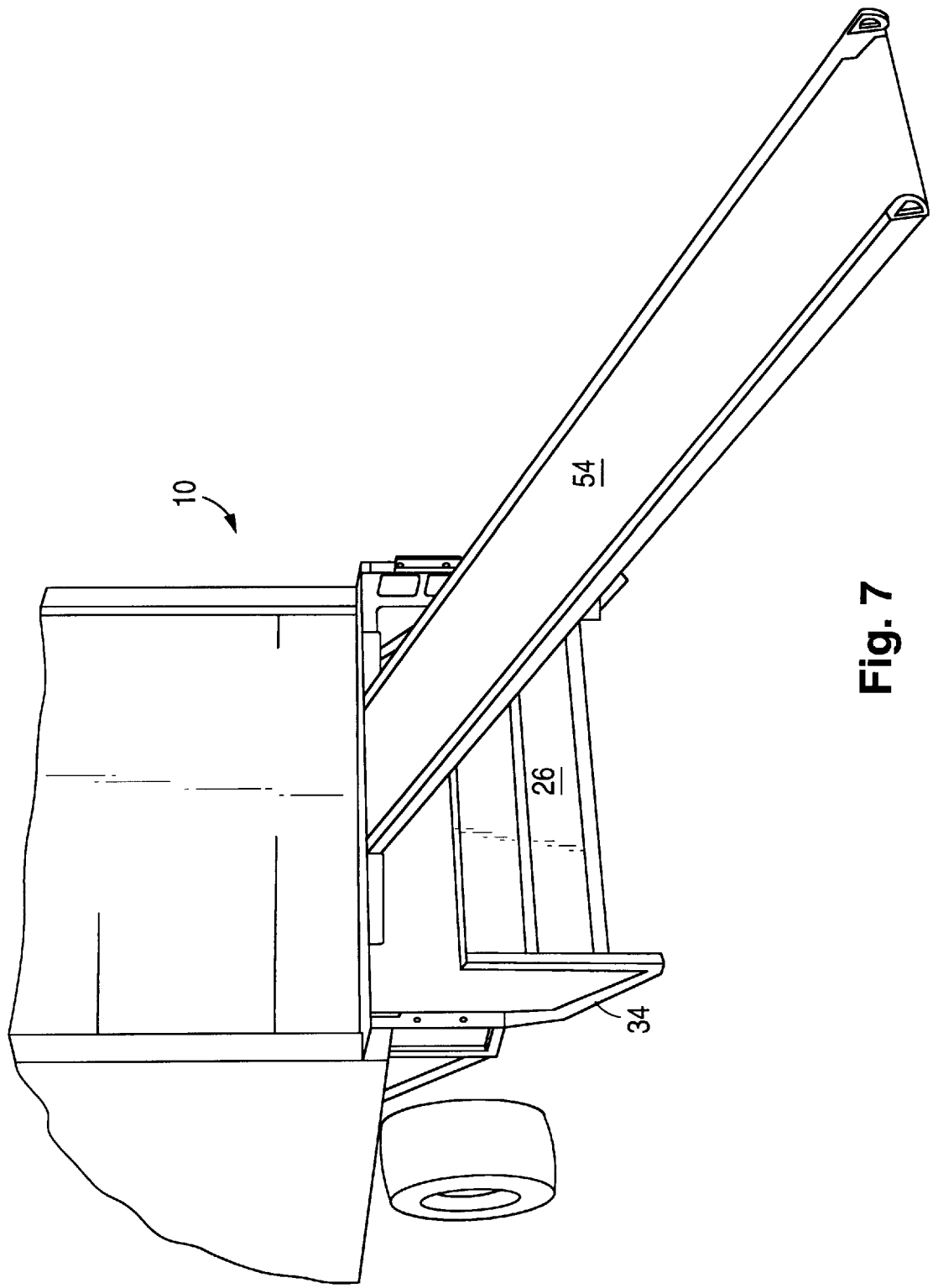
FIG. 7 shows a sliding loading ramp being deployed over the lift gate and hitch system.

As shown in FIG. 7, the lift gate and hitch system 12 of the invention allows the use of a sliding loading ramp 54. By simply lowering lift gate 26, ramp 54 may slide out from storage under the vehicle chassis 14. By providing compatibility with both hydraulic powered lift gate 26 and ramp 54, vehicle 10 is exceedingly versatile. A truck outfitted with the system of the invention is suitable for heavy commercial applications using the lift gate as well as lighter duty applications such as public rentals for which the sliding ramp 54 may be more suitable. The provision of hitch further increases the utility of the vehicle.

An important feature of the invention is the movement of lift gate 26 between its raised, lowered and stowed positions. The rotation of lift gate 26 into the vertical position shown in FIG. 4, followed by its elevation and inversion into the stowed position shown in FIGS. 2 and 3, allows hitch 20 to be placed as aft as possible. Indeed, preferably hitch 20 is recessed no more than 6 inches from the rearmost extremity of either the vehicle chassis 14 or the lift gate system 12. This aft position of hitch 20 allows for improved turning radius of the vehicle and towed trailer by creating more clearance between the vehicle and the trailer. The increased clearance also minimizes jack-knifing when pushing the trailer in reverse. The aft position of hitch 20 also facilitates access to the hitch when engaging or disengaging the trailer.

Described herein is a preferred embodiment, however, one skilled in the art that pertains to the present invention will understand that there are equivalent alternative embodiments.

What is claimed is:

1. An integrated lift gate and hitch system configured to be secured to a vehicle chassis comprising two support brackets rigidly secured to the vehicle chassis, a cross brace extending between and being secured to said support brackets, a tow hitch secured to said cross brace, said cross brace and tow hitch being positioned such that said tow hitch is recessed forward no more than six inches from the rearmost extremity of either the vehicle chassis or lift gate when the latter is stowed, pivot member brackets secured to said support brackets, and lift gate brackets, said pivot member brackets and lift gate brackets supporting a parallelogram linkage and an hydraulic cylinder pivotally attached to one of said support brackets, such that actuation of said hydraulic cylinder causes said lift gate to progress between horizontal loading and vertical stowing orientations without contacting said tow hitch.

* * * * *